Nov. 13, 1928.
W. C. KEYS
1,691,723
CUSHIONING CONNECTION
Filed May 21, 1928
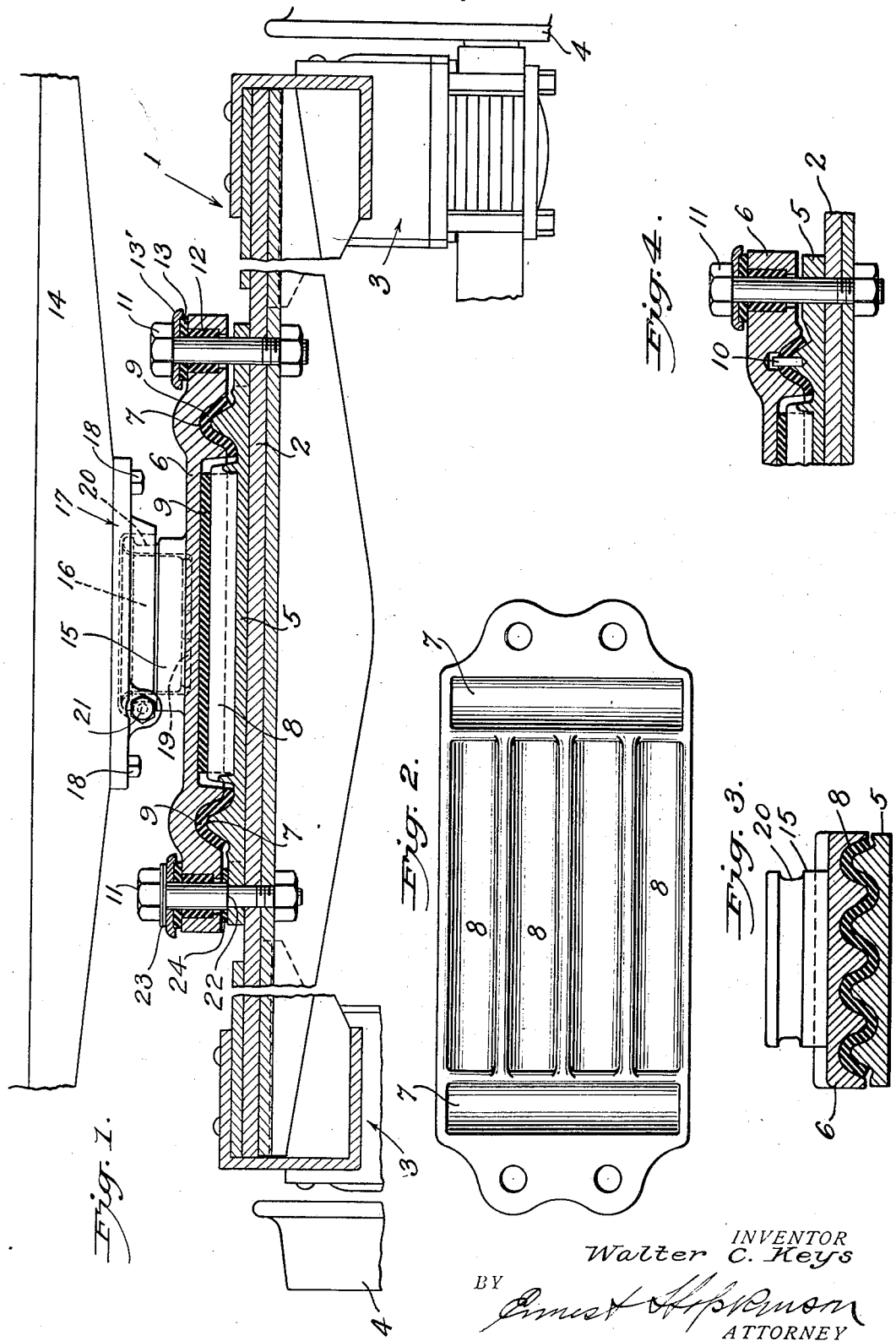
INVENTOR
Walter C. Keys
BY
Ernest Hipkinson
ATTORNEY Patented Nov. 13, 1928.

1,691,723

UNITED STATES PATENT OFFICE.

WALTER C. KEYS, OF DETROIT, MICHIGAN, ASSIGNOR TO THE MECHANICAL RUBBER COMPANY, OF CLEVELAND, OHIO, A CORPORATION OF NEW JERSEY.

CUSHIONING CONNECTION.

Application filed May 21, 1928. Serial No. 279,442.

This invention relates in general to cushioning connections and particularly to a sound and vibration reducing connection for use between the trucks and the bodies of vehicles such as railway cars. Heretofore it has been a practice to use bolster plates which form an all-metal connection between the trucks and the car body, but this form of construction has been found objectionable in the respect that sound and other high frequency vibrations, which usually arise as a result of unevenness in wheel contacts with the rails, are transmitted from the trucks directly through the metal-to-metal connections to the body of the car, causing a great deal of noise and vibration which should be eliminated.

One object of this invention is to provide a connection adapted to eliminate or at least materially reduce the transmission of sound or high frequency vibrations to the car body while at the same time being capable of supporting the load and resisting shifting, in parallelism, of the car body in all directions with respect to the truck. This shifting tendency arises, for instance, when transferring the driving or braking strain from the truck to the body, or during side sway of the car.

Another object is to provide a connection of the foregoing character incorporating simplicity and ruggedness and which is inexpensive to manufacture.

Other objects and advantages will appear as the description proceeds, reference being had to the following specification and the accompanying drawing in which:

Fig. 1 is a fragmental transverse section of a truck and vehicle body illustrating one embodiment of the invention;

Fig. 2 is a bottom plan view of one of a pair of cooperating members;

Fig. 3 is a cross section of said members assembled, and

Fig. 4 is a detail.

Referring to the drawings which illustrate one embodiment of the invention, reference numeral 1 indicates generally a vehicle truck which includes a bolster 2 supported upon any suitable form of suspension 3 having wheels 4. Two cooperating members comprising a bolster plate 5 positioned upon the bolster 2, and an upper bolster plate 6 superposed upon the lower one are both provided with complementary projections and recesses, such as the lateral and longitudinal corrugations respectively designated 7 and 8 which are adapted to interfit. Between the interfitting corrugations 7 and 8 there is interposed suitable cushioning material 9 such as rubber composition, preferably rubber alternated with fabric, or duck impregnated with rubber, or any other suitable sound and vibration deadening material. This cushioning material may be molded to the required shape so as to conform to the interfitting corrugations 7 and 8, or a sheet of the material may be placed in flat form between the bolster plates 5 and 6 and then when the two are pressed together during assembly, the material 9 will be pressed into shape between the corrugations and into intimate contact with the opposed surfaces thereof. In order to prevent slippage of the sheet during such forming operation between the corrugations, small pins 10, such as disclosed in Fig. 4 may be used. This applies to both the lateral and longitudinal corrugations 7 and 8.

In the embodiment illustrated herein the material 9 is distributed in three separate sections namely, one which interposes the corrugations 8 and extends longitudinally of the direction of car travel and two oppositely disposed sections interposing the lateral corrugations 7 of both of the bolster plates 5 and 6. In some cases a single piece of material 9 may be used to interpose all of the corrugations. For holding the bolster plates 5 and 6 in cooperative relation with the rubber composition 9, there is provided a plurality or relatively large bolts 11 which pass through both of the bolster plates 5 and 6 and then through the truck bolster 2. One of the bolster plates, in this case the upper one 6, is insulated from the bolts 11 by means of cushioning material in the form of a sleeve 12 and a washer 13 between which latter and the head of the bolt 11 there is preferably interposed a cupped retaining cap 13'. It will be seen that the bolts 11 clamp the two bolster plates 5 and 6 in cooperative relation to the interposed cushioning material 9 and secure both plates firmly to the truck bolster 2. While the bolts 11 may comprise the sole means for holding the lower bolster plate 5 to the bolster 2, it is preferably to secure this lower plate by suitable additional means, such as doweling or separately bolting to the bolster 2, as will be readily understood.

For pivotally connecting the car body 14 to the truck 1, the upper bolster plate 6 may be provided with a circular upstanding collar 15 into which there extends a downwardly directed pivot pin 16 carried by an element 17 secured by means of bolts 18 to the car body 14, the body of the pin 16 being adapted to rest upon a bearing plate 19. The collar 15 has a circumferential groove 20 in which a cross bolt 21 carried by the element 17 rides freely to permit rotary motion of the body 14 with respect to the truck 1 while holding them together. It is obvious that numerous other forms of construction for effecting this pivotal connection of the truck 1 to the body 14 may be employed, the one disclosed herein being used merely as an example of a type suitable for the purpose.

From the foregoing description it will be seen that the corrugations 7 and 8 cooperate with the interposed cushioning material 9 to prevent the transmission of vibrations between the truck 1 and the body 14 and also prevent shifting of the bolster plates 5 and 6 in parallelism in any direction, due to the fact that any such shifting tendency causes a direct compression of the interposed cushioning material between the corrugated portions in a direction substantially through the thickness of the material, as differentiated from the shearing action and lateral slippage which would result if the material were in flat form between the bolster plates. The corrugations therefore obviate any parallel shifting of the car body with respect to the truck either during driving or braking or side sway of car body and there is provided a substantial connection which effectively minimizes the transmission of sound and other vibrations.

If it becomes desirable to permit easier flow of the interposed cushioning material 9 under load, spaced grooves may be provided in the faces of the material.

It is to be understood that while the invention has been disclosed herein as embodying the use of corrugations, numerous other forms of projections and recesses may be found to possess at least some of the advantages of the corrugations and hence the invention is not restricted to the precise construction disclosed.

As an example of another arrangement of the interfitting corrugations, they may be disposed concentrically upon their respective plates.

Furthermore, instead of the plain bolts 11, each may be provided with a shoulder 22 adapted to be drawn down against the plate 5 whereby to limit the compression of the cushioning material 9. When the shouldered bolts are used shims 23 are preferably provided beneath the head of the bolts to obtain the desired degree of compression, and washers of suitable material, such as duck and rubber, may be interposed between the plates 5 and 6 as indicated at 24.

The invention is not limited to the embodiment disclosed herein, but has application to a wide variety of situations wherein the parts of a device must be held together positively while cushioning the parts from each other and preventing relative shifting thereof in parallelism.

Having thus described my invention, what I claim and desire to protect by Letters Patent is:

1. A cushioning connection for vehicles intermediate their body portion and trucks, comprising a pair of members operatively connected to the body portion and trucks respectively and provided with complementary projections and recesses and vibration deadening material located intermediate said projections and recesses and filling the space between said complementary projections and recesses.

2. A cushioning connection for vehicles intermediate their body portion and trucks, comprising a pair of corrugated plates, the corrugations of which are adapted to interfit and extend in directions at angles to each other to prevent relative shifting of the plates in parallelism in any direction, resilient vibration deadening material intermediate the corrugated portions of said plates, and means for clamping said material between said corrugated plates, and maintaining the plates in parallel cooperative relation.

3. A cushioning connection for vehicles intermediate their body portion and trucks, comprising a pair of corrugated plates, the corrugations of which are adapted to interfit and extend in directions at angles to each other to prevent relative shifting of the plates in parallelism in any direction, resilient vibration deadening material intermediate the corrugated portions of said plates, and means for clamping said material between said corrugated plates and maintaining the plates in cooperative relation, said clamping means having a cushioned connection with at least one of said plates.

4. A motor vehicle suspension comprising a body portion, a bolster plate pivoted thereto and provided at its lower face with corrugations extending in different directions, resilient vibration deadening material lining said corrugations, a complementary bolster plate cooperating with said first plate and engaging said material, means for maintaining said bolster plates and material in cooperative working relation, and wheel trucks connected to said second plate.

5. A cushioning connection for vehicles intermediate their body portion and trucks, comprising two members each having similarly arranged surface corrugations, the members being positioned one above the other with said corrugations disposed in interfitting opposition, rubber composition interposed between the corrugated surfaces, fasteners adapted to hold said rubber composition and said members in cooperative relation and also to secure them to the truck, means for shock insulating said fasteners from at least one of said members, and means for connecting the upper one of said members to the vehicle body.

6. A cushioning connection for vehicles intermediate their body portion and trucks, comprising an upper member having longitudinal and transverse corrugations, pivotal means of connection of said upper member to the car body, a lower member having longitudinal and transverse corrugations similar to those of the upper member and interfitting the same, rubber composition interposed between said corrugations, bolts adapted to hold said members and said rubber composition in cooperative relation, said bolts being also adapted to secure said members to the truck, and means for shock insulating said bolts from at least one of said members.

7. A cushioning connection, including at least two members operatively connected together and provided with complementary projections and recesses, and vibration deadening material located intermediate said projections and recesses and filling the space between said complementary projections and recesses.

8. A cushioning connection, including at least two members having complementary projections and recesses adapted to interfit, vibration deadening material located intermediate said projections and recesses, and means for clamping the material between said members in contact with the surfaces thereof, said means being arranged to limit the clamping pressure.

Signed at Detroit, county of Wayne, State of Michigan, this 16th day of May, 1928.

WALTER C. KEYS.